United States Patent [19]

Yamashita et al.

[11] 4,100,482
[45] Jul. 11, 1978

[54] METHOD AND APPARATUS FOR MEASURING ELLIPSE PARAMETERS OF ELECTROMAGNETIC POLARIZATION IN GEOPHYSICAL EXPLORATION

[75] Inventors: Mitsura Yamashita, Willowdale; Kousaku Hirano; Nguyen Dang Thai, both of Don Mills, all of Canada

[73] Assignee: Mits-Co Geophysics Ltd., Willowdale, Canada

[21] Appl. No.: 700,775

[22] Filed: Jun. 29, 1976

[51] Int. Cl.$^2$ .............................................. G01V 3/10
[52] U.S. Cl. .......................................................... 324/6
[58] Field of Search ........................................ 324/3–9

[56] References Cited

U.S. PATENT DOCUMENTS

| | | | |
|---|---|---|---|
| 1,672,328 | 6/1928 | Loth | 324/7 |
| 3,149,278 | 9/1964 | Cartier et al. | 324/8 X |
| 3,389,331 | 6/1968 | Vexler | 324/8 |
| 3,538,431 | 11/1970 | Moss | 324/6 |
| 3,609,522 | 9/1971 | Hutchins | 324/6 |
| 3,984,758 | 10/1976 | Millon | 324/6 |

FOREIGN PATENT DOCUMENTS

| | | | |
|---|---|---|---|
| 625,063 | 8/1961 | Canada | 324/6 |
| 654,474 | 12/1962 | Canada | 324/6 |
| 126,200 | 5/1959 | U.S.S.R. | 324/6 |
| 232,405 | 4/1969 | U.S.S.R. | 324/6 |

OTHER PUBLICATIONS

Ward et al., Multispectral Electromagnetics Applied to a Groundwater Problem, Geophysics, vol. 38, No. 6, Dec. 1973, pp. 1226, 1227.

*Primary Examiner*—Gerard R. Strecker
*Attorney, Agent, or Firm*—Donald E. Hewson

[57] ABSTRACT

A method and apparatus for measuring ellipse parameters of polarization of an electromagnetic field are disclosed. When a geophysical anomaly exists which, in the presence of a primary alternating electromagnetic field will produce a secondary field, the resultant field is elliptically polarized and the ellipse of polarization is tilted at any location where the presence of the secondary field is being tested for. A receiver is provided having crossed coils, and both the receiver and transmitter have specific orientations which are set up whenever the receiver and transmitter are situated at any location for testing for the presence of an anomaly at least in the region of the receiver. When signals are detected on the crossed coils of the receiver, the receiver is maintained in its specific orientation while the signals from the crossed coils are examined at least so as to determine the phase difference quantity $\phi$ between the signals from the crossed coils and the magnitude ratio quantity $r$ of those signals. With the quantities $\phi$ and $r$, such ellipse parameters of polarization of the resultant EM field in the region of the receiver as the tilt angle, ellipticity angle and ellipticity ratio thereof can be determined by mathematical analysis and processing. In high noise situations, or where the signal level on either receiver coil is low, signal level stacking circuits are utilized to arithmetically add signal levels of succeeding signals until such time as one of the signals being stacked reaches a predetermined level. In general, the transmitter and receiver may operate at a number of different frequencies, one at a time; and while they are not linked in any way, each of the transmitter and receiver contains identical stable oscillators and frequency dividers.

15 Claims, 4 Drawing Figures

METHOD AND APPARATUS FOR MEASURING ELLIPSE PARAMETERS OF ELECTROMAGNETIC POLARIZATION IN GEOPHYSICAL EXPLORATION

FIELD OF THE INVENTION

This invention relates to a method and apparatus for measuring the ellipse parameters of polarization of secondary electromagnetic fields for purposes of geophysical exploration. In particular, the invention provides a method and apparatus for measuring ellipse parameters of polarization of EM fields, which parameters are the manifestation of geophysical anomalies and occur in the presence of a primary alternating EM field, using a pair of crossed coils, where no physical rotation of the coils is made nor electrical rotation of the coils synthesized; and the method is operable to give significant results at any single frequency, although it may be operated in subsequent steps at several frequencies for even greater significance of derived data.

BACKGROUND OF THE INVENTION

In general, there are a number of different approaches to electromagnetic (EM) geophysical exploration, including airborne and ground systems. Airborne systems are generally flown from an aircraft or helicopter by being towed therefrom in a "bird", and generally comprise a number of transmitter and receiver coils operating to transmit primary EM fields and to detect changes in the detected secondary EM fields. In other words, airborne systems are generally useful only for determining the presence of a geophysical anomaly, and are not particularly useful for determining certain parameters of the anomaly whereby the presence of specific commercial ores may be determined, the depth and size of the deposit may be estimated, and other more specific data with respect to particular ores being sought for may be determined. Ground systems may be used for detecting the presence of geophysical anomalies in the first instance, and thereafter some analysis of the geophysical anomaly — an ore body — may be determined, including the characteristics mentioned above such as identification of mineralization and metal-carrying ore bodies, the depth and size of the ore body, the possible concentration of specific desired minerals, etc.

In general, prior ground systems which have been used have always required the tuning or rotation, or both, of receiver coils so as to determine certain geophysical data. This has come from the fact that geophysical anomalies which are generally desirable mineralization and ore bodies will produce a secondary alternating electromagnetic field in the presence of a primary alternating electromagnetic field — and, in general, the primary EM field is transmitted at a frequency in the audio range, e.g. 50 to 20,000 Hz. Where a secondary EM field is produced by a desirable or economic geophysical anomaly, the resultant field is elliptically polarized, and comes as a result of eddy currents which are induced in the geophysical anomaly. Any such resultant field thereby includes signals at the frequency of the transmitted primary EM field which are not in-phase with the transmitted field, and in general such signals are measured with respect to their quantities which can be determined to be "in-phase" and "quadrature" with respect to the transmitted primary field. The resultant EM field, however, is generally tilted with respect to the plane of the transmitted primary field at the location where the receiver is placed, so that it has been necessary in the past, where the tilt angle of the resultant field is desired to be known, to physically rotate or electrically synthesize rotation of the perpendicularly crossed coils in order to find a null point on one of the coils which then gives an indication of tilt angle of the ellipse of polarization of the resultant field. Still further, it has very often been required to use yet a further reference coil in the receiver; and in any event, it has been required that there be some sort of physical or electrical link between the receiver and transmitter, except in those systems which operate either from fixed VLF transmitters or in the presence of magnetic time transients or fluctuations of the earth's magnetic field.

For example, G. H. McLaughlin et al, in U.S. Pat. No. 3,126,510 dated Mar. 24, 1964 teach a method and means of geophysical prospecting where a pair of coils are placed in the magnetic field which normally exists. The fact of the polarization of the normal earth's magnetic field at an angle other than generally horizontal is detected by physically rotating the coils in the field. The coils which are used may be orthogonally related one to the other, and a reference coil may be used; but in any event the rotation of the coil is required.

Another approach to EM prospecting is taught in Seigel U.S. Pat. No. 2,903,642, issued Sept. 8th, 1959, which teaches the use of a pair of transmitting coils which operate at two different frequencies, and a pair of orthogonal receiving coils. The presence of a secondary field, which is indicative of the presence of a geophysical anomaly, is detected and the nature of that anomaly may be determined to some extent by comparison of the orthogonal signals which are detected at both frequencies. The Seigel apparatus requires that the receiver coils are fixed in space with respect to one another, and notes that comparison and continuous recording of the differences of the fields detected in the coils at both frequencies determines the presence of a conductor anomaly. However, there is no consideration of determination of ellipse parameters of the field, merely concern for the detection of a secondary field which is indicative of the presence of a geophysical anomaly.

Ronka, in U.S. Pat. No. 3,500,175 dated Mar. 10, 1970, on the other hand, teaches a portable EM apparatus which utilizes fixed VLF transmitters — which are operated at at least eight radio stations around the world by the United States Navy and similar authorities — whereby two coils which are orthogonally fixed with respect one to the other are used. The coils are tilted until a null is observed, which provides an indication of tilt angle of the secondary field which may exist as a result of the VLF signals which are present.

Ghosh et al, in U.S. Pat. No. 3,936,728 issued Feb. 3, 1976 teach an apparatus and method of obtaining diagnostic information with respect to a geophysical anomaly, whereby magnetic induction field and electric induction field components are studied at a series of frequencies in the range of 5 to 43,000 Hz., whereby a reference coil is oriented with respect to the secondary field being studied.

All of these prior approaches to geophysical exploration and particularly to geophysical study of detected anomalies by way of determination of the tilt angle of the ellipse of polarization as well as a measure of the ellipticity angle and ellipticity ratio thereof, have a number of disadvantages including particularly the fact that each measurement takes a considerable period of time because of the necessity of determining a null.

Especially when a number of frequencies are used, the measurement time becomes quite uneconomic. In locations where there is a weak signal, or the signal-to-noise ratio is poor, even more time has been required. The accuracy of measurement is, in any event, usually poor and depends to quite an extent on the skill and experience of the operator. Thus, widely different readings may be obtained at the same location by different operators, and analysis of such data then becomes difficult.

Still further, the ground EM systems of the prior art, as discussed above, present the problem that the measurement of ellipticity — tilt angle, ellipticity angle and ellipticity ratio — of a detected secondary field is successful, in the first instance, upon the proper orientation of the receiver coils. In the event of minimal ellipticity — i.e., when the elliptical polarization becomes nearly circular — it is extremely difficult to distinguish or discriminate null and maximum signal positions or orientations of the coils. Still further, when using conventional ground EM systems, unless particular sign conventions are observed only absolute ellipticity can be determined without regard to the direction of polarization or the direction of tilt angle, thereby resulting in false or misleading data reduction analysis.

The present invention overcomes all of the difficulties spoken of above, and differs significantly from any prior approach, in that it provides a pair of fixed coils which are usually perpendicularly related to each other in a receiver which is located at a place remote from a transmitter and completely independent from the transmitter. No rotation of the coils is required, either physically or by electrical synthesis, and the presence of a geophysical anomaly can be determined by examining the signals on both of the coils, as well as providing for the determination of such ellipse parameters as the tilt angle, ellipticity angle and ellipticity ratio of the polarization ellipse of the resultant EM field.

Thus, the method provided by this invention comprises the steps of fixing a transmitter in a first specific orientation and fixing a receiver which has a pair of crossed coils therein in a second specific orientation, so that the specific orientations of the transmitter and receiver may each be set up at each transmission location and at each testing location, respectively, of the transmitter and receiver. In other words, it is determined that, during any particular electromagnetic survey procedure according to this invention, which may extend over a wide area, there is a specific orientation established for the transmitter and a specific orientation established for the receiver, and each time the transmitter and receiver are set up they are positioned in their respective orientations so that the relative orientation between them remains fixed. The distance between the transmitter and receiver may, of course, vary; and often the transmitter remains in a particular location and is merely rotated so as to maintain a fixed specific orientation with respect to the direction in which the receiver is placed so that the relative orientations between the receiver and transmitter remain constant. The receiver is, of course, placed at a location which is within range of the transmitter but is remote from it; and no wire or radio link is set up between them except as may be established by virtue of the transmission from the transmitter of a primary alternating electromagnetic field. Each time the transmitter and receiver are oriented, a primary alternating EM field is transmitted at at least one known frequency from the transmitter — and in the usual circumstances, where signals are detected at the receiver, primary EM fields at a number of frequencies are transmitted from the transmitter, one after another, merely by selecting the frequency of operation of the transmitter in a manner discussed in greater detail hereafter. During transmission of the alternating EM field, the orientation of the transmitter and of the receiver are maintained constant, and the output from the coils in the receiver is detected. In general, the crossed coils in the receiver are fixed perpendicularly one to the other; but they may be fixed other than orthogonally, in which case additional signal processing circuits would be required. In any event, when there is an output detected from both of the coils of the receiver, the signals from those coils are examined so as to determine the phase difference between the detected signals and the magnitude ratio of the signals at the frequency of the transmitted primary EM field, which frequency is known. When the phase difference between detected signals of the crossed coils and the receiver and the magnitude ratio of those signals are each determined, the quantities which are expressed thereby may then be mathematically analyzed and processed so as to obtain such ellipse parameters of polarization of the resultant electromagnetic field as the tilt angle, ellipticity angle and ellipticity ratio thereof.

Thus, when a primary alternating electromagnetic field is transmitted at a known frequency, and there is a geophysical anomaly which will manifest itself in the presence of such primary electromagnetic field by producing a secondary electromagnetic field at the same frequency, the total or resultant field is one which is elliptically polarized and whose ellipse of polarization is tilted at any location where the presence of a secondary field is being tested for. In other words, where there is no secondary field, there is no elliptical polarization of a resultant field and therefore signals detected on both coils which are as a result only of the primary field in the absence of any secondary field are of equal magnitude and are in phase. However, in the presence of a secondary field, the resultant field will be elliptically polarized to some extent or another, and thus there will be a phase difference detected between signals which are derived from the pair of crossed coils, respectively; and depending upon the amount of ellipticity, there will be a magnitude ratio between the detected signals from the crossed coils which will be other than unity.

All of this comes because coupling to the crossed coils, in free space, is inductive; and therefore any induced voltage on either coil in free space exists solely as the result of the presence of an electromagnetic field. When there is both a primary and a secondary EM field, the coupling is quite complex in nature, and gives rise to the presence of different signals on the crossed coils — especially when the crossed coils are perpendicularly related one to the other as would be the usual case — so that a phase difference and/or a magnitude ratio rather than unity exists with respect to the signals from each of the coils, depending on the amount of ellipticity there is of the resultant EM field.

By the same token, where there is no geophysical anomaly — i.e., no practical conductive material being tested for at the frequency of the EM field then being transmitted — there is no electrical polarization of a secondary field at the frequency being transmitted, and no apparent resultant field is therefore detected. Thus, if at any frequency there is an apparent resultant electromagnetic field giving rise to complex coupling to the coils, tests are generally made with transmissions at a number of frequencies for purposes of obtaining more highly diagnostic geophysical data. This comes also as a consequence of the fact that coupling of the geophysical anomaly and the resultant secondary field produced thereby varies depending upon the frequency of the transmitted primary field; and therefore, unless it can be readily determined that there is, indeed, no practical geophysical anomaly present, it is usual to transmit signals at at least several frequencies and to test for a secondary field which is manifested by the complex coupling of the resultant EM field to the fixed and fixedly oriented crossed receiver coils.

During transmission of a primary alternating electromagnetic field from a transmitter at one location to a receiver in another location, the specific orientation of the transmitter and receiver — and thereby the relative orientation between them — are maintained; and the signals thereby being sampled are examined to determine the phase difference between them and the magnitude ratio of them. The phase difference between the detected signals is defined as a quantity $\phi$; and the magnitude ratio of the detected signals is defined as a quantity $r$.

When the quantities $\phi$ and $r$ can be determined at any frequency, those quantities can be mathematically analyzed and processed so as to obtain such ellipse parameters of polarization of the resultant EM field at the transmitted frequency as the tilt angle, ellipticity angle and the ellipticity ratio thereof.

The present invention also provides for the arithmetic addition of the signal level of succeeding signals which are being sampled from both of the crossed coils of the receiver, in respective signal level stacking circuits. This is, in essence, a wave stacking procedure, and may be carried out where there is an output signal from one of the coils having a very low amplitude — which may be the result of a weak signal component of the resultant field being tested — or so as to improve the signal-to-noise ratio of the detected signals. In the latter case, the arithmetic addition of the signal level of succeeding signals is gated or otherwise controlled so as to be synchronous with the frequency of the transmitted primary field; e.g. so that each successive positive going signal is added to the signal level of the preceding positive going signals, for example. Because noise is generally quite random in nature, during each successive gating operation of the signal level stacking circuits, the noise may be positive or negative going and, over several cycles of the primary field tends to be self-cancelling. In other words, a noise filter is thereby achieved, especially when the transmitted primary EM field is sinusoidal.

Certain rules can be established for determination of ellipticity or elliptical polarization parameters, and they are discussed in greater detail hereafter. However, it is possible, in accordance with this invention, to provide a suitably programmed calculating means which, by processing the quantities $\phi$ and $r$ referred to above and the signals from which those quantities are derived, will give results which are indicative of the tilt angle, ellipticity angle and ellipticity ratio. Of course, as noted above, it is very often desirable to test the geophysical anomaly at more than one frequency; and this is accomplished without physically moving or disturbing in any way the orientation of the receiver coils, assuming that the transmitter coil also remains stationary for operation at another frequency. For these purposes, as well as for purposes of calibration and exact determination of ellipse parameters, the transmitter and receiver are each equipped with identical stable oscillators and frequency dividers. Thus, by merely switching a frequency divider setting, the frequency of the transmitted primary EM field can be altered; and, of course, a similar alteration is made to the frequency divider in the receiver so as to maintain accuracy and meaningfulness of the signal analysis.

BRIEF SUMMARY OF THE INVENTION

This invention, therefore, provides a method and an apparatus for detection of geophysical anomalies and for determination of ellipse parameters of elliptically polarized resultant fields produced by such geophysical anomalies.

Another object of this invention is to provide an apparatus which can be easily and inexpensively produced, and which provides for signal stacking and arithmetic and/or mathematical processing of signals so as to determine certain quantities and parameters from the signals being sensed.

Yet another object of this invention is to provide a method of measuring ellipse parameters of polarization of a detected resultant EM field which is not dependent upon the skill and experience of the operator.

A still further purpose of this invention is to overcome a number of the shortcomings of previous ground EM systems, while allowing for the possibility of the apparatus of the present invention to be flown as well as operated as a ground system.

BRIEF DESCRIPTION OF THE DRAWINGS

These and other features and objects of the present invention are more fully described hereafter, in association with the accompanying drawings, in which.

DESCRIPTION OF THE PREFERRED EMBODIMENTS

As noted above, the present invention provides a method and apparatus for geophysical exploration and detection of geophysical anomalies which manifest themselves by production of a secondary alternating electromagnetic field in the presence of a primary alternating electromagnetic field, whereby the resultant elliptically polarized field as examined so as to measure the ellipse parameters of polarization of the resultant field. The transmitter and receiver are each placed in fixed specific orientations so that there is a fixed relative orientation between them, no matter what the distance may be between them, and the receiver may be placed in a location or a number of locations relative to the transmitter providing that the specific orientations of the transmitter and receiver are maintained during any one transmission operation. The accuracy and veracity of the ellipse parameter data which may be determined according to this invention are substantially independent of the distance that the receiver is placed from the transmitter, nor do they require any direct physical or electrical connection between the transmitter and receiver. Thus, the setting up time for any particular measurement in any particular location of the receiver and of the transmitter is considerably lessened over that required in the prior art methods.

Where, at any known frequency of transmission of a primary electromagnetic field, outputs are detected from both crossed coils in the receiver, the signals are examined to determine the phase difference quantity $\phi$ between them and the magnitude ratio quantity $r$ of those signals at the known transmitted frequency of the primary EM field. As noted, when the quantities $\phi$ and $r$ are determined, they may be mathematically analyzed and processed so as to obtain such ellipse parameters of polarization of the resultant EM field as the tilt angle, ellipticity angle and ellipticity ratio thereof. With such knowledge, particularly if similar analyses are made at a number of frequencies, for each survey or test locations of the transmitter and receiver, respectively, highly diagnostic data and information concerning the geophysical anomaly which has produced the secondary field and thereby caused the resultant elliptically polarized field to be produced, may be derived.

Figure 1:
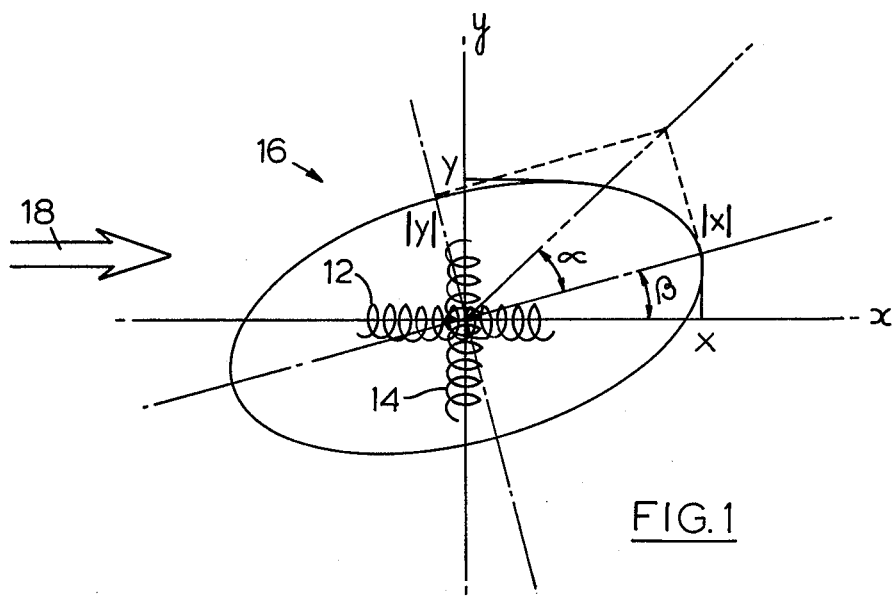
FIG. 1 is a representation of a polarization ellipse of a resultant electromagnetic field.

The rules for determination of the polarization parameters can be developed according to theory of elliptical polarization and with respect to known mathematic and trigonometric relationships, as discussed hereafter with particular reference to FIG. 1. In that figure, there are shown schematically a pair of crossed coils 12 and 14. For purposes of this discussion, it is assumed that the crossed coils 12 and 14 are perpendicularly oriented one to the other, and moreover that they are situated along the X and Y axes of the figure shown. The axis of coil 12 — which, for this discussion, is coincident with the X axis — may be parallel to the direction of transmission of the primary EM field, but not usually. In any event, a polarization ellipse 16 is shown, and that represents a plane electromagnetic wave at the frequency of the EM primary field, with the proviso that elliptical polarization occurs when the electric vector which describes the ellipse makes one complete revolution during one cycle of the EM primary field. In general terms, the field vector is elliptically polarized because its extremity describes an ellipse during one cycle.

The following relationships exist, by examination of FIG. 1:

(i) The magnitude of the signal detected from coil 12 is $$X = |X| \exp(j\phi_1) \qquad \text{Eq. 1}$$

(ii) The magnitude of the signal detected from the coil 14 is $$Y = |Y| \exp(j\phi_2) \qquad \text{Eq. 2}$$

From equation 1 and equation 2, it follows that:

$$\text{quantity } \phi = \phi_2 - \phi_1 \qquad \text{Eq. 3}$$

$$\text{quantity } r = (|Y|/|X|) = \tan \gamma \qquad \text{Eq. 4}$$

Quantity $\phi$ is designated the phase difference quantity, and quantity $r$ is designated the magnitude ratio quantity with respect to the signals detected from coils 12 and 14.

Now, it is evident that from the above, the value of $\gamma$ may be determined; and according to the theory, $$\tan 2\beta = \tan 2\gamma \cos \phi \qquad \text{Eq. 5}$$

and $$\sin 2\alpha = \sin 2\gamma \sin \phi \qquad \text{Eq. 6}$$

Therefore (v) Tilt angle $\gamma = \tfrac{1}{2} \tan^{-1}(\tan 2\gamma \cos \phi)$ \qquad Eq. 7

(vi) Ellipticity angle $\alpha = \tfrac{1}{2} \sin^{-1}(\sin 2\gamma \sin \phi)$ \qquad Eq. 8

(vii) Ellipticity ratio $e = \tan \alpha = \tan[\tfrac{1}{2}\sin^{-1}(\sin 2\gamma \sin \phi)]$ \qquad Eq. 9

Also, since $$\tan 2\gamma = 2 \tan \gamma /(1-\tan^2\gamma) = 2r/(1-r^2) \qquad \text{Eq. 10}$$

and $$\sin 2\gamma = 2 \tan \gamma /(1+\tan^2\gamma) = 2r/(1+r^2) \qquad \text{Eq. 11}$$

Therefore $\beta = \tfrac{1}{2} \tan^{-1}\left(\dfrac{2r \cos\phi}{1 - r^2}\right)$ \qquad Eq. 12 and $\alpha = \tan^{-1} e = \tfrac{1}{2} \sin^{-1}\left(\dfrac{2r \sin\phi}{1 + r^2}\right)$ \qquad Eq. 13

Still further, since $|Y|\cos \phi$ and $|Y|\sin \phi$ are the in-phase and quadrature components of Y with reference to X, therefore $$\beta = \tfrac{1}{2} \tan^{-1}\left[\dfrac{2\dfrac{Y_{in}}{X}}{\left\{1 - \left(\dfrac{Y_{in}}{|X|}\right)^2 - \left(\dfrac{Y_{out}}{|X|}\right)^2\right\}}\right] \qquad \text{Eq. 14}$$

and $\tfrac{1}{2} \sin^{-1}\left[\dfrac{2\dfrac{Y_{out}}{X}}{\left\{1 + \left(\dfrac{Y_{in}}{|X|}\right)^2 + \left(\dfrac{Y_{out}}{|X|}\right)^2\right\}}\right]$ \qquad Eq. 15

Figure 2:
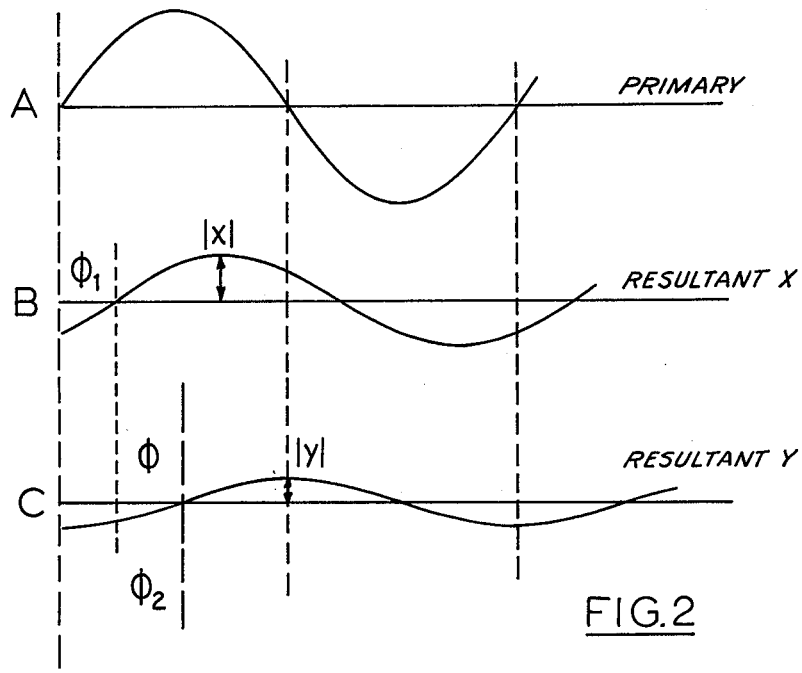
FIG. 2 is a trace of three curves, the primary EM field and the two detected signals on the crossed coils of a receiver, showing the determination of phase difference quantity.

Referring to FIG. 2, reference is made to curve A which shows a sinusoidal primary wave representative of the transmitted primary EM field. Curve B shows a signal similar to that detected from coil 12; which is the X component of the resultant field; and it is shown to be out of phase with the primary field by an amount $\phi_1$. Similarly, curve C shows a signal similar to that detected from coil 14, which is the Y component of the resultant field; and it is out of phase with respect to the primary field by an amount $\phi_2$. The phase difference between the signals in curves B and C, namely phase difference quantity $\phi$, is also shown.

Figure 3:
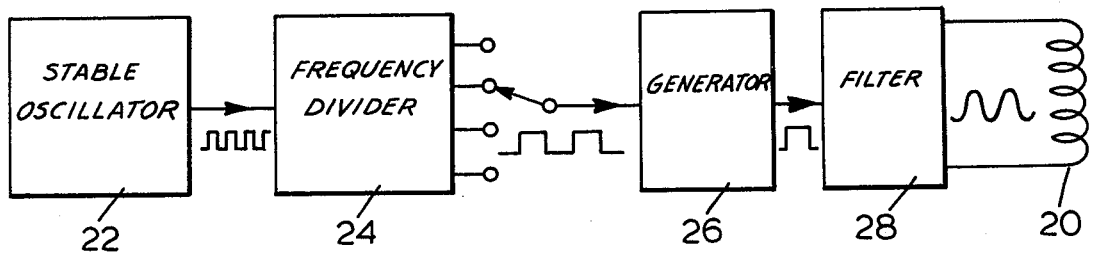
FIG. 3 is a block diagram of a typical transmitter circuit.

Referring now to FIG. 3, a typical transmitter circuit is shown. The transmitter comprises a transmitter coil 20, which derives and transmits a sinusoidal EM wave in the following manner. The stable oscillator 22 produces a square wave signal at a relatively high frequency, and that signal is divided by frequency divider 24 which may have a number of settings. The output from the frequency divider 24 is, in turn, fed to a driven square wave power generator 26, whose output is suitably filtered by filter circuits 28 to produce the sinusoidal signal which is imposed upon the transmitter coil 20.

Figure 4:
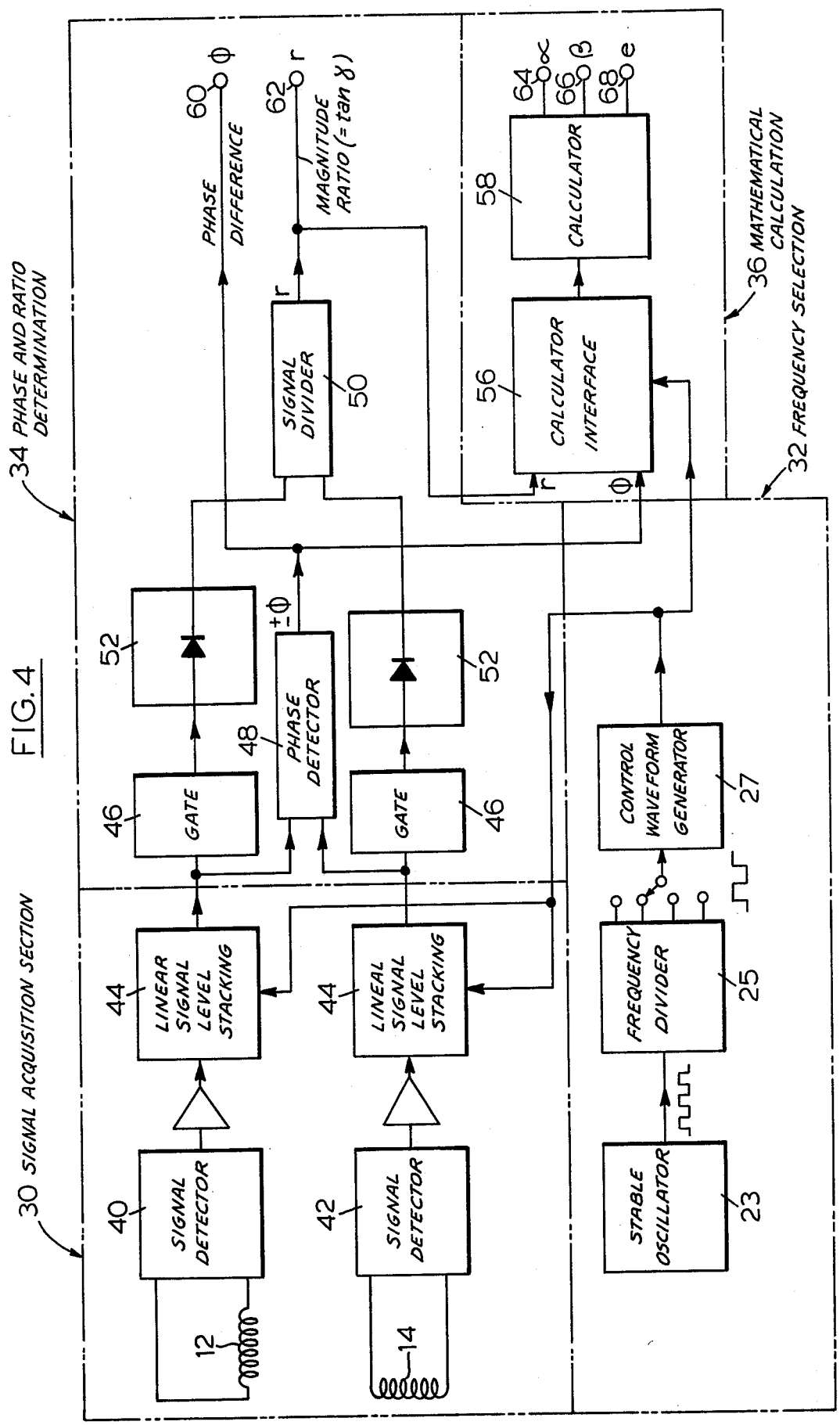
FIG. 4 is a block diagram of typical receiver and signal processing circuits according to this invention.

Referring now to FIG. 4, there is shown a typical receiver circuit according to this invention. The receiver circuit in FIG. 4 comprises a number of basic sections, including the signal acquisition section 30, the frequency selection section 32, the phase and ratio determination section 34 and the mathematical calculation section 36.

The frequency selection block 32 includes a stable oscillator 23, a frequency divider 25 and a control waveform generator 27. At least the stable oscillator 23 and the frequency divider 25 are identical to the stable oscillator 22 and the frequency divider 24 of the transmitter of FIG. 3.

The signal acquisition section 30 includes signal detectors 40 and 42 which are associated with the receiver coils 12 and 14 respectively. The output from the signal detectors 40 and 42 are each fed to identical linear signal level stacking circuits 44, which may be rendered inoperative in the event that the signal level is sufficiently high that signal level stacking is not required. In any event, the output of each of the linear signal level stacking circuits 44 is fed to a gate 46, which is likewise rendered inoperative — i.e., in a signal-passing mode — if the linear signal level stacking circuits 44 are inoperative. At the same time, the outputs from the linear signal level stacking circuit 44 are fed to a phase detector 48, whose output is a function of the phase difference quantity $\phi$ between the signals detected by the receiver coils 12 and 14.

Referring to the linear signal level stacking circuits 44, they are operative in the event that there is a low signal-to-noise ratio of the signals detected by receiver coils 12 and 14, or in the event that the signal level per se is quite low. In either event, the signal level from successive cycles of signals detected from the coils 12 and 14 is arithmetically added to the accumulated signal levels of preceding signals — i.e., wave stacking — until such time as one or the other of the linear signal level stacking circuits reaches a predetermined level. At that instant, gates 46 pass the signal from the signal level stacking circuits to a signal divider 50, whose output is a signal which is a function of the magnitude ratio quantity $r$ [or $|Y|/|X| = \tan\gamma$] of the signal detected on the coils 12 and 14. Obviously, the signal divider — which, essentially, is a DC operating device from rectifier circuits 52 — provides an accurate indication of signal magnitude ratio of the signals on coils 12 and 14 whether or not the determination is made instantaneously or whether it is necessary for the linear signal level stacking circuits 44 to have operated, provided only that the linear signal level stacking circuits 44 each operate linearly and either without decay or with the same decay rates. Therefore, the quantity $r$, and the quantity $\phi$, can be easily determined in the presence of signals on each of the receiver coils 12 and 14.

It will be noted, of course, that the linear signal level stacking circuits 44 are gated from the output of the control waveform generator 27. Thus, the frequency of operation of the linear signal level stacking circuits is identical to the frequency of transmission of the primary EM field, but need not necessarily be synchronized therewith provided only that it is at the same frequency so that phase lock can be synthesized in the manner demonstrated in the curves of FIG. 2.

The signals from the phase detector 48 and the signal divider 50, which are functions of the phase difference quantity $\phi$ and the magnitude ratio quantity $r$, respectively, are fed to a calculator interface 56, and thence to a calculator such as a microprocessor or other suitably programmed calculating means 58.

The method of the present invention, however, contemplates that when the quantities $\phi$ and $r$ are determined, there can be mathematical analysis and processing of those quantities to obtain such ellipse parameters of polarization as the tilt angle $\beta$, the ellipticity angle $\gamma$, and the ellipticity ratio $e$. Obviously, suitably programmed calculating means such as a microprocessor can be used; but equally obviously, those further quantities which are representative of the ellipse parameters of the detected resultant EM field can be determined by reference to previously prepared tables or charts.

Equally obviously, all the ellipse parameters whose output may be derived from the output terminals 60, 62, 64, 66 and 68, may be fed to chart or other recorders in either analogue or digital form, as required.

For example, all of the quantities which are representative of the ellipse parameters may be fed through suitable analogue to digital converters for further data processing directly in computers and the like. Likewise, additional information with respect to the frequency being transmitted may be added for diagnostic and other analytic purposes.

It is evident, from the above discussion, that at any time there is considerably less time taken for each measurement, because the necessity for rotation and determination of secondary field null is precluded, with only the requirement for setting up the transmitter and receiver in any location in their respective fixed orientations. Likewise, there is a saving of time because no calculation is required for distance between the the transmitter and the receiver; all of the necessary data being, as indicated above, available from the detected signals provided that the proper mathematical analysis is applied.

It has also been noted above that the accuracy of measurement is not operator-dependent, so that with proper operating equipment, a very high degree accuracy can be determined no matter who the operator may be and no matter how experienced that operator is.

Because there is a signal stacking technique contemplated, using the linear signal level stacking circuits 44, the signal-to-noise ratio will be greatly improved; and surveys which are difficult because of noise interference can be more easily facilitated while still obtaining a high degree of accuracy of measurement and diagnostic data with respect to the detected geophysical anomaly.

Obviously, the signs of ellipticity and tilt angle (positive or negative) can be automatically determined, simply by reference to the output of the phase detector and a determination as to whether or not the zero crossing point of, say, the signal from the receiver coil 12 precedes or lags the zero crossing point of the signal from the receiver coil 14.

In general, the total period of time required at any one frequency for a determination of all of the parameters — and, in particular, the time required to obtain signals which are functions of the quantities $\phi$ and $r$ — is only a few seconds at most.

The present invention also contemplates, in another embodiment thereof, a method of substantially obviating or negating terrain effects, by making two sets of measurements at each transmitter/receiver location placement when the plane of transmission on axis from the transmitter of the primary alternating EM field is rotated 90° from the first set of measurements for the second set of measurements. Thus, in a situation where there may be pronounced terrain effects on the EM survey results — such as when there is a steeply sloping terrain which may also have conductive overburden — the transmitter coil is rotated on a horizontal axis through 90° without otherwise changing its position, to another specific orientation therefor, and a second set of measurements is made at the receiver at the same frequency or frequencies as the first set of measurements. Usually, the horizontal axis about which the transmitter coil is rotated is taken through the centre of the coil or at its edge, and extends substantially perpendicularly to the coupling axis between the transmitter and receiver.

This precludes the necessity of having to interchange the positions of the transmitter and receiver — or to have apparatus capable of operating in either mode — as has been known in the past. Of course, during data reduction and analysis, the results of the two sets of measurements that have been made with the two primary EM fields which were 90° shifted from one another in their planes of transmission on axis from the transmitter, are added together so that the terrain effects tend to substantially cancel each other.

There has been disclosed a method and an apparatus of measuring the ellipse parameters of polarization of a resultant electromagnetic field which occurs as a consequence of a manifested secondary EM field from a geophysical anomaly in the presence of a transmitted primary EM field. Reference has been made to the fact that the receiver coils are generally perpendicularly crossed and fixed with respect one to the other; but it has been noted that the coils might be arranged at an angle other than perpendicular, provided that suitable signals can be developed from which the phase difference quantity $\phi$ and the magnitude ratio quantity $r$ can be determined so that the remaining ellipse parameters can be derived. Obviously, using the general method and apparatus of this invention, diagnosis and analysis of geophysical anomalies can be easily and accurately performed; but it is evident that apparatus according to this invention could be flown in the usual manner that airborne EM systems are normally flown for the first-case detection of the presence of physical anomalies. Moreover, when apparatus according to the present invention is flown, analysis and determination of the phase difference quantity $\phi$ and magnitude ratio quantity $r$ which are indicative of elliptical polarization may be determined either in real time or, with signal stacking, according to a predetermined time domain operation. In any event, with an airborne system using apparatus according to the present invention, there is no direct link between the transmitter and the receiver, although each operate at the same frequency of transmission and signal gating and processing, respectively; and even if the bird swings to some extent, in time domain operation such swinging can be considered to be noise and signal averaging — wave stacking — operation using the linear signal level stacking circuits may still provide quite accurate determinations of the phase difference quantity $\phi$ and magnitude ratio quantity $r$.

In general, however, it is more common to use the method and apparatus of the present invention as a ground EM system, whereby a geophysical anomaly which is known to exist may be analyzed — usually at a number of different frequencies — for purpose of determining whether or not further exploitation of such mineralization and ore body deposits and the like is economic and desirable.

During any survey operation where a number of setups of the transmitter and receiver are required, it has been noted that the receiver and transmitter are always set up in fixed orientations so that the relative orientation between them remains constant, no matter what the distance between them may be. Consistency and meaningfulness of derived data is thereby assured. Likewise, it has been noted that even where there is no phase difference quantity $\phi$ and no magnitude ratio quantity $r$ detected at one given primary EM transmission frequency, at least one or two other frequencies of primary EM field transmission may be tested for a determination of phase differece and magnitude ratio at those frequencies, due to the frequency dependence of coupling of a geophysical anomaly to the transmitted primary EM field and therefore the frequency dependence of the manifested secondary field and the resultant elliptically polarized field.

It is evident that there is no necessity for any wire link, radio link or otherwise between the transmitter and the receiver — that is, there is no physical or electronic synchronizing link from the transmitter to the receiver. This comes particularly as a result of the incorporation in each of the transmitter and receiver of identical stable oscillators and frequency dividers. Normally, the stable oscillator may be a crystal controlled IF oscillator which operates in the range of 10 mHz, so that a shift or difference of operating frequency of the stable oscillator is generally quite without effect, amounting only to a few parts per million, and such minor differences can be accommodated because of the band width of the signal detection circuits at audio frequencies which are relatively very low compared to the frequency of the stable oscillator.

The circuits which have been discussed above are typical circuits, and the steps of the method which have been discussed above the basic steps with respect to the invention. However, other additions, alterations, amendments or deletions with respect to the method and apparatus of the present invention may be made without departing from the spirit and scope of the appended claims.

The embodiments of the invention in which an exclusive property or privelege is claimed are defined as follows:

1. A method of geophysical exploration and detection and geophysical anomalies which manifest themselves by production of a secondary alternating electromagnetic field in the presence of a primary alternating electromagnetic field, where the resultant secondary field is elliptically polarized and the ellipse of polarization is tilted at any location where the presence of said secondary field is being tested for, by measuring the ellipse parameters of polarization of said resultant secondary electromagnetic field, where said method comprises the steps of:

(a) placing a transmitter in a first specific orientation at a transmission location and placing a receiver having a pair of crossed coils therein in a second specific orientation at a testing location remote from said transmission location, so that said specific orientations of said transmitter and receiver coils are maintained at any transmission location and testing location, respectively, during execution of the following steps;

(b) when said transmitter and receiver are each set up in a transmission and testing location, respectively, such that said receiver is within range of said transmitter, transmitting a primary electromagnetic field at at least one known frequency from said transmitter;

(c) when an output signal is detected from both of said crossed coils of said receiver, examining said output signals to determine the phase difference quantity $\phi$ between said detected signals and the magnitude ratio quantity $r$ of said signals at said known transmitted frequency of said primary EM field; and (d) where the quantities $\phi$ and $r$ are determined, mathematically analyzing and processing said quantities to obtain such ellipse parameters of polarization of the resultant secondary electromagnetic field as the tilt angle, ellipticity angle and ellipticity ratio thereof.

2. The method of claim 1 where said pair of crossed coils in said receiver are fixed perpendicularly one to the other.

3. The method of claim 2 where the frequency of transmission of said primary alternating electromagnetic field is controlled by a first stable oscillator and frequency divider, and where the signal processing and conditioning circuits of said receiver are controlled by a second stable oscillator and frequency divider which are substantially identical to said first stable oscillator and frequency divider.

4. The method of claim 3 including the further step of arithmetically adding the signal levels of succeeding signals from both coils of said receiver in first and second signal level stacking circuits, each of which is controlled by said second stable oscillator and freqency divider, until the level in one of said signal level stacking circuits reaches a predetermined level, whereupon an output from each of said signal level stacking circuits is gated to signal divider means whereby the magnitude ratio quantity $r$ can be determined.

5. The method of claim 3 where said quantities $\phi$ and $r$ are mathematically analyzed according to the following rules:

(i) magnitude of the signal detected from a first coil of said receiver $$X = |X| \exp(j\phi_1)$$

(ii) magnitude of the signal detected from the other coil is $$Y = |Y| \exp(j\phi_2)$$

(iii) quantity $\phi = \phi_2 - \phi_1$
(iv) quantity $r = |Y|/|X| = \tan\gamma$
(v) tilt angle $\beta = \frac{1}{2} \tan^{-1}(\tan 2\gamma \cos\phi)$
(vi) ellipticity angle $\alpha = \frac{1}{2} \sin^{-1}(\sin 2\gamma \sin\phi)$
(vii) ellipticity ratio $e = \tan\alpha = \tan[\frac{1}{2}\sin^{-1}(\sin \gamma 2 \sin\phi)]$ 6. The method of claim 5 where the quantities $\beta$ and $\alpha$ are also expressed as:

$$\beta = \frac{1}{2} \tan^{-1}\left(\frac{2r \cos\phi}{1 - r^2}\right) \quad \text{(VIII)}$$

$$\alpha = \tan^{-1} e = \frac{1}{2} \sin^{-1}\left(\frac{2r \sin\phi}{1 + r^2}\right) \quad \text{(IX)}$$

7. The method of claim 5 where said quantities $\phi$ and $r$ are fed to a suitably programmed calculating mens for determination therein of said further quantities $\beta$, $\alpha$ and $e$.

8. The method of claim 3 where, when an output is detected from both coils of said receiver at a first transmitted frequency of said primary alternating electromagnetic field, said primary field is subsequently transmitted at at least another frequency while maintaining said first and second orientations of said transmitter and receiver coils, respectively.

9. The method of claim 3 including the further step of rotating the transmitter coil on a horizontal axis through 90° to a third specific orientation which differs from said first specific orientation only in respect of the position of said rotated transmitter coil, and repeating said steps (c) and (d).

10. The method of claim 9 where the axis about which said transmitter coil is rotated extends substantially perpendicularly to the coupling axis between said transmitter and said receiver.

11. Apparatus for detection of geophysical anomalies which manifest themselves by production of a secondary alternating electromagnetic field in the presence of a primary alternating electromagnetic field, where the resultant field is elliptically polarized and the ellipse of polarization is tilted at any location where the presence of said secondary field is being tested for, comprising:

(a) a transmitter capable of transmitting a primary alternating electromagnetic field at at least one frequency, and being capable of being set up and maintained in a first specific orientation at a transmission location during any such transmission procedure;

(b) a receiver including a pair of crossed coils, and being capable of being positioned at a testing location remote from said transmitter and of being set up and maintained in a second specific orientation of said crossed coils at any such testing location during any transmission procedure from said transmitter;

(c) first and second signal detecting means for detecting the presence of a signal on the one of the other of said crossed coils of said receiver, respectively;

(d) phase detector means for detecting and producing a signal which is a functon of the phase difference quantity $\phi$ between the signals detected on said crossed coils of said receiver;

(e) signal divider means for producing a signal which is a function of the magnitude ratio quantity r of the signals detected on said crossed coils of said receiver; and (f) calculating means for mathematically analyzing and processing said phase differece quantity $\phi$ and said magnitude ratio quantity r to obtain such ellipse parameters of polarization of said resultant electromagnetic field as the tilt angle, ellipticity angle and ellipticity ratio thereof.

12. The apparatus of claim 11 where said pair of crossed coils in said receiver are fixed perpendicularly one to the other.

13. The apparatus of claim 12 further comprising first and second substantially identical stable oscillators and frequency dividers in said transmitter and said receiver, respectively.

14. The apparatus of claim 13, further including first and second signal level stacking circuits interposed between said respective first and second signal detecting means and said phase detector and said signal divider means.

15. The apparatus of claim 11 where the coil of said transmitter is capable of being rotated 90° about a horizontal axis to a third specific orientation.

* * * * *